US012533698B2

(12) United States Patent
Sekiya et al.

(10) Patent No.: US 12,533,698 B2
(45) **Date of Patent: *Jan. 27, 2026**

(54) CHEMICAL SOLUTION SPRAYING METHOD

(71) Applicant: MAINTECH CO., LTD., Tokyo (JP)

(72) Inventors: Hiroshi Sekiya, Tokyo (JP); Tomohiko Nagatsuka, Fuji (JP); Kazuyujki Yusa, Fuji (JP); Ayano Suga, Tokyo (JP)

(73) Assignee: MAINTECH CO., LTD., Tokyo (JP)

( * ) Notice: Subject to any disclaimer, the term of this patent is extended or adjusted under 35 U.S.C. 154(b) by 495 days.

This patent is subject to a terminal disclaimer.

(21) Appl. No.: 17/999,026

(22) PCT Filed: May 17, 2021

(86) PCT No.: PCT/JP2021/018573

§ 371 (c)(1),
(2) Date: Nov. 16, 2022

(87) PCT Pub. No.: WO2021/235381

PCT Pub. Date: Nov. 25, 2021

(65) Prior Publication Data

US 2023/0182157 A1 Jun. 15, 2023

(30) Foreign Application Priority Data

May 18, 2020 (JP) ................................. 2020-086742

(51) Int. Cl.

| | |
|---|---|
| ***B05B 12/04*** | (2006.01) |
| ***B05B 13/04*** | (2006.01) |
| ***D21F 1/32*** | (2006.01) |

(52) U.S. Cl.

CPC .......... *B05B 12/04* (2013.01); *B05B 13/0405* (2013.01); *D21F 1/32* (2013.01)

(58) Field of Classification Search

None

See application file for complete search history.

(56) References Cited

U.S. PATENT DOCUMENTS

| | | | | |
|---|---|---|---|---|
| 6,177,192 B1 * | 1/2001 | Asano | D01F 6/84 | 428/364 |
| 2006/0162889 A1 * | 7/2006 | Sekiya | D21F 1/30 | 162/199 |

(Continued)

FOREIGN PATENT DOCUMENTS

| | | |
|---|---|---|
| JP | 2004-58031 A | 2/2004 |
| JP | 2004-218186 A | 8/2004 |

(Continued)

*Primary Examiner* — Michael P. Rodriguez

(74) *Attorney, Agent, or Firm* — Muncy, Geissler, Olds & Lowe, P.C.

(57) ABSTRACT

A chemical solution spraying method for spraying a chemical solution onto canvas K1 has a loop shape in a side view while reciprocating nozzle device S along rail L extending in a width direction of canvas K1 with respect to canvas K1, in which time period Tc during which canvas K1 is in contact with wet paper X is 0.03 seconds or more, time period Tn required for nozzle device S to one-way move is 0.2 to 20 minutes, traveling speed Vp of canvas K1 is 500 m/min or more, length K of canvas K1 is 20 to 80 m, a number of times of contact N of any point on a surface of canvas K1 with wet paper X during time period Tn, time period Tn, traveling speed Vp, and length K satisfy a relationship of N=(Tn·Vp)/K, under predetermined conditions.

7 Claims, 3 Drawing Sheets

(56) References Cited

U.S. PATENT DOCUMENTS

| | | | | |
|---|---|---|---|---|
| 2017/0073895 | A1 * | 3/2017 | Sekiya | B08B 3/022 |
| 2020/0048836 | A1 * | 2/2020 | Sekiya | B05B 13/0442 |
| 2023/0183922 | A1 * | 6/2023 | Sekiya | D21F 1/325 162/199 |

FOREIGN PATENT DOCUMENTS

| | | | | |
|---|---|---|---|---|
| JP | 2005-314814 | A | 11/2005 | |
| JP | 2015-193957 | A | 11/2015 | |
| WO | WO-2019189713 | A1 * | 10/2019 | B05B 13/0214 |

* cited by examiner

CHEMICAL SOLUTION SPRAYING METHOD

TECHNICAL FIELD

The present invention relates to a chemical solution spraying method, and more specifically to a chemical solution spraying method in spraying a chemical solution onto a canvas of a paper-making machine.

BACKGROUND ART

A paper-making machine for manufacturing paper includes a dry part for heating and drying wet paper.

In the paper-making machine, when the wet paper is fed to the dry part, the wet paper is conveyed while being pressed against a surface of a dryer roll by a canvas. The wet paper is dried by the dryer roll.

There is a problem that in the dry part, paper powder or pitch contained in the wet paper easily adheres to each of components. Among them, the canvas continues to contact the wet paper while drying the wet paper. Accordingly, the paper powder or the pitch tends to easily adhere to the canvas, in particular. If the paper powder or the pitch adheres to the canvas, the paper powder or the pitch is transferred to the wet paper, thereby causing the yield of the paper to greatly decrease.

On the other hand, a liquid spraying method for injecting, using a liquid spraying and application device including an atomization nozzle for atomizing a liquid and an air flow injection port for injecting an air flow, the air flow from the air flow injection port toward the liquid atomized from the atomization nozzle, accelerating the atomized liquid by the air flow, and spraying the liquid to a canvas has been known (see, e.g., Patent Literature 1).

An antifouling agent spraying and application method for spreading an antifouling agent from a spread nozzle toward a contact start site between an outer surface of a canvas and an out roll, making the antifouling agent adhere to the out roll, and transferring and applying the antifouling agent to the canvas via the out roll has been known (see, e.g., Patent Literature 2).

A method for preventing contamination on a surface of a traveling component using a plurality of injection nozzles in a dry part in applying the antifouling agent to the surface of the traveling component by the injection nozzles has been known (see, e.g., Patent Literature 3).

The applicant has filed a chemical solution spraying method for nozzle devices arranged with a predetermined spacing to each spray a chemical solution onto a dryer roll that guides wet paper while reciprocating the nozzle devices along a rail extending in a width direction of the dryer roll with the dryer rolls rotated in a dry part of a paper-making machine (see Patent Literature 4).

CITATION LIST

Patent Literature

PTL 1: Japanese Patent Application Laid-Open No. 2004-58031
PTL 2: Japanese Patent Application Laid-Open No. 2004-218186
PTL 3: Japanese Patent Application Laid-Open No. 2005-314814
PTL 4: International Publication No. WO 2019/189713 Pamphlet

SUMMARY OF INVENTION

Technical Problem

However, according to the spraying method described in each of Patent Literatures 1 to 3, described above, it cannot be necessarily said that the chemical solution can be uniformly applied to the canvas, although the chemical solution can be sprayed onto the canvas.

The canvas contacts the wet paper, whereby the chemical solution applied to the surface of the canvas is easily absorbed in the wet paper. Particularly, the higher the traveling speed of the canvas becomes, the larger the number of times any point on the surface of the canvas having a loop shape contacts the wet paper becomes, and thus the higher a frequency at which the chemical solution is absorbed in the wet paper becomes. Accordingly, an amount of the chemical solution at any point on the surface of the canvas is insufficient. As a result, an effect based on the chemical solution cannot be sufficiently exhibited.

The spraying method described in Patent Literature 4, described above, is an invention of a method for spraying the chemical solution onto the dryer roll that contacts the wet paper for a relatively short time period. This can also be incorporated into a canvas. However, it cannot be said that the above-described problem can be sufficiently solved in the spraying method described in Patent Literature 4, described above, for the canvas that contacts the wet paper for a relatively long time period, like in the present invention.

The present invention has been made in view of the above-described circumstances, and is directed to providing a chemical solution spraying method for applying a chemical solution to a surface of a canvas that contacts wet paper for a time period Tc of 0.03 seconds or more as uniformly as possible and enabling a sufficient amount of the chemical solution to remain thereon while reciprocating a nozzle device in a width direction with respect to the canvas.

Solution to Problems

The inventors of the present invention have intensively studied to solve the above-described problem and found that the above-described problem can be solved by specifying a spray amount of a chemical solution, a time period Tn required for a nozzle device to one-way move, a traveling speed Vp of a canvas, and a length K of the canvas, and a number of times of contact N and adjusting them to satisfy a predetermined relationship in their respective ranges, leading to completion of the present invention.

The present invention resides in (1) a chemical solution spraying method for spraying a chemical solution onto a canvas having a loop shape in a side view while reciprocating a nozzle device along a rail extending in a width direction of the canvas with respect to the canvas in a dry part of a paper-making machine, in which the canvas is guided by a dryer roll with the canvas contacting wet paper, and is then guided by a canvas roll with the canvas separating from the wet paper, a time period Tc during which the canvas is in contact with the wet paper is 0.03 seconds or more, a time period Tn required for the nozzle device to one-way move is 1 to 20 minutes, a traveling speed Vp of the canvas is 500 m/min or more, a length K of the canvas is 20 to 80 m, a number of times of contact N of any point on a surface of the canvas with the wet paper during the time period Tn, the time period Tn, the traveling speed Vp, and the length K satisfy a relationship of N=(Tn·Vp)/K, and the number of times of contact N is 50 to 150, and a spray amount of the chemical solution is 0.1 to 500 mg/$m^2$ as an effective component amount.

The present invention resides in (2) the chemical solution spraying method described in the foregoing item (1), in which the canvas roll includes an outside canvas roll positioned outside the canvas and an inside canvas roll positioned inside the canvas, and the nozzle device sprays the chemical solution onto the canvas in a time period elapsed until the canvas contacts the first outside canvas roll after separating from the wet paper.

The present invention resides in (3) the chemical solution spraying method described in the foregoing item (1) or (2), in which an average movement speed Va of the nozzle device is 0.5 to 6 m/min, a paper width R of the wet paper is 5 to 13 m, and the average movement speed Va, the paper width R, and the time period Tn satisfy a relationship of Tn=R/Va.

The present invention resides in (4) the chemical solution spraying method described in any one of the foregoing items (1) to (3), in which the nozzle device sprays a chemical solution in a fan shape extending in a width direction in a front view toward the canvas, and a spray width in the canvas of the chemical solution to be momentarily sprayed by the nozzle device is 1.5 to 15 cm.

The present invention resides in (5) the chemical solution spraying method described in any one of the foregoing items (1) to (4), in which the wet paper contains 50% by mass or more of recycled pulp.

The present invention resides in (6) the chemical solution spraying method described in any one of the foregoing items (1) to (5), in which the chemical solution is an antifouling agent composition containing at least one type selected from a group consisting of an amino-modified silicone oil, an epoxy-modified silicon oil, a polyether-modified silicone oil, polybutene, a vegetable oil, and a synthetic ester oil.

The present invention resides in (7) the chemical solution spraying method described in any one of the foregoing items (1) to (6), in which a material for the canvas is polyethylene, an absolute value of a zeta potential of the chemical solution is 3 to 100 mV, and the chemical solution is sprayed under a temperature condition of 30 to 130 degrees.

Advantageous Effects of Invention

In the chemical solution spraying method according to the present invention, the traveling speed Vp of the canvas and the length K of the canvas are respectively set within the above-described ranges, whereby the productivity is improved, thereby making it possible to manufacture paper products at lower cost.

In addition thereto, the time period Tc during which the canvas is in contact with the wet paper is 0.03 seconds or more, the spray amount of the chemical solution, the time period Tn required for the nozzle device to one-way move, the number of times of contact N of any point on the surface of the canvas with the wet paper during the time period Tn are respectively set within the above-described ranges, and are further adjusted to satisfy the relationship of N=(Tn·Vp)/K, thereby making it possible to apply the chemical solution to the surface of the canvas that travels at high speed as uniformly as possible and enabling a sufficient amount of the chemical solution to remain thereon while reciprocating the nozzle device in the width direction with respect to the canvas.

Accordingly, even if the wet paper to be conveyed absorbs the chemical solution applied to the surface of the canvas every time the wet paper contacts the canvas within the above-described range of the number of times of contact, the sufficient amount of the chemical solution remains, thereby making it possible to prevent the amount of the chemical solution from being partially insufficient on the canvas. As a result, an effect based on the chemical solution can be sufficiently exhibited.

In the chemical solution spraying method according to the present invention, the nozzle device sprays the chemical solution onto the canvas in the time period elapsed until the canvas contacts the first outside canvas roll after separating from the wet paper, thereby making it possible to also transfer the chemical solution to the outside canvas roll that contacts the surface side (the side contacting the wet paper) of the canvas. As a result, an effect based on the chemical solution can also be applied to the outside canvas roll. When the transfer of the chemical solution to the outside canvas roll is saturated, the transfer cannot be performed, thereby enabling a sufficient amount of the chemical solution to remain on the surface of the canvas.

In the chemical solution spraying method according to the present invention, the average movement speed Va of the nozzle device is set within the above-described range, thereby making it possible for the nozzle device to stably spray the chemical solution. The paper width R of the wet paper is set within the above-described range, thereby making it possible to reliably exhibit an effect of the present invention.

The time period Tn required for the nozzle device to one-way move can be calculated from the average movement speed Va and the paper width R of the wet paper. Thus, even when the paper width of the wet paper has changed by changing a setup of the wet paper, for example, the movement speed or the like of the nozzle device is adjusted, thereby enabling a sufficient amount of the chemical solution to remain on the surface of the canvas.

In the chemical solution spraying method according to the present invention, the nozzle device sprays the chemical solution in a fan shape extending in the width direction in a front view toward the canvas. The spray width in the canvas of the chemical solution to be momentarily sprayed by the nozzle device is set within the above-described range, thereby making it possible to efficiently apply a sufficient amount of the chemical solution.

In the chemical solution spraying method according to the present invention, when the wet paper contains 50% by mass or more of recycled pulp, an amount in which the wet paper absorbs the chemical solution tends to increase. Accordingly, an effect of the present invention can be more exhibited.

In the chemical solution spraying method according to the present invention, when the chemical solution is an antifouling agent composition containing at least one type selected from a group consisting of an amino-modified silicone oil, an epoxy-modified silicon oil, a polyether-modified silicone oil, polybutene, a vegetable oil, and a synthetic ester oil, paper powder or pitch contained in the wet paper can be prevented from adhering to the canvas. This can also prevent the paper powder or the pitch from being transferred to the wet paper and the canvas roll from the canvas.

In the chemical solution spraying method according to the present invention, the material for the canvas is polyethylene, and the absolute value of the zeta potential of the chemical solution is 3 to 100 mV, the chemical solution easily adheres to the canvas, thereby enabling a more sufficient amount of the chemical solution to remain on the surface of the canvas.

DESCRIPTION OF EMBODIMENTS

Figure 1:
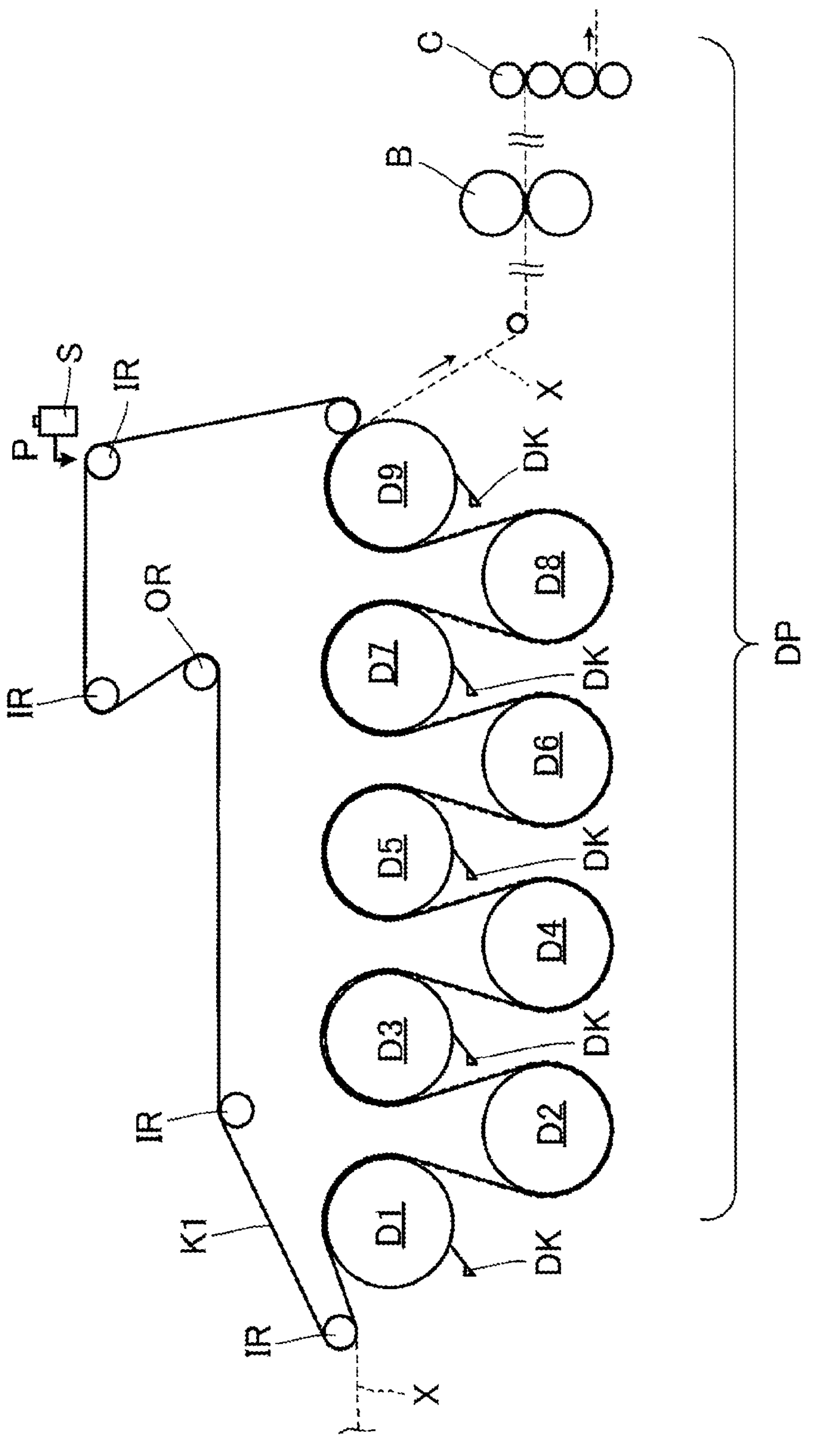
FIG. 1 is a schematic view illustrating a dry part of a paper-making machine using a chemical solution spraying method according to the present embodiment.

A preferred embodiment of the present invention will be described in detail below with reference to the drawings, if necessary. In the drawings, the same elements are respectively assigned the same reference numerals, and overlapping description is omitted. A positional relationship among the top, the bottom, the left, and the right, for example, is based on a positional relationship illustrated in the drawings, unless otherwise noted. Further, dimensional ratios in the drawings are not limited to illustrated ratios.

A chemical solution spraying method according to the present embodiment is used in a dry part of a paper-making machine.

FIG. 1 is a schematic view illustrating a dry part of a paper-making machine using a chemical solution spraying method according to the present embodiment.

As illustrated in FIG. 1, a dry part DP of a paper-making machine includes a plurality of cylindrical dryer rolls (Yankee dryers) D1, D2, D3, D4, D5, D6, D7, D8, and D9 (hereinafter referred to as "D1 to D9") for heating and drying wet paper X, doctor blades DK each brought into contact with any of the dryer rolls D1, D3, D5, D7, and D9, a canvas K1 for pressing the wet paper X against respective surfaces of the dryer rolls D1 to D9, a breaker stack roll B that rotates while temporarily pressing the wet paper X heated and dried by the dryer rolls D1 to D9, and a calendar roll C that rotates while pressing the wet paper X temporarily pressed by the breaker stack roll B. That is, the dry part DP includes as components at least the dryer rolls D1 to D9, the canvas K1, the breaker stack roll B, and the calendar roll C.

Examples of the wet paper X to be approximately adoptable include conventional ones. However, among them, wet paper containing 50% by mass or more of recycled pulp is favorably used, and wet paper containing 90% by mass or more of recycled pulp is more favorably used. In this case, an amount in which the wet paper X absorbs a chemical solution tends to increase. Accordingly, an effect of the present invention can be more exhibited.

The conveyance speed (speed per second) of the wet paper X is 500 m/min or more, preferably 500 to 1800 m/min, and more preferably 500 to 1300 m/min. In this case, the productivity is improved, thereby making it possible to manufacture paper products at lower cost.

The chemical solution spraying method according to the present embodiment is favorably used for the canvas K1 in the dry part DP.

In the dry part DP, when the canvas K1 contacts the wet paper X that travels, the canvas K1, together with the wet paper X, travels at the same speed as that of the wet paper X, and is guided by each of the dryer rolls D1 to D9 (hereinafter also referred to as a "first guidance"). That is, the canvas K1 is guided by the dryer rolls D1 to D9 with the canvas K1 contacting the wet paper X. At this time, the canvas K1 sequentially brings the wet paper X into pressure contact with the respective surfaces of the dryer rolls D1 to D9. Accordingly, a chemical solution on a surface of the canvas K1 is absorbed in the wet paper X with time, and the wet paper X is heated and dried by the dryer rolls D1 to D9.

When the wet paper X and the canvas K1 pass through the dryer rolls D1 to D9, the wet paper X is separated from the canvas K1 and is guided to the breaker stack roll B.

On the other hand, the canvas K1 that has separated from the wet paper X is guided by a canvas roll (hereinafter also referred to as an "outside canvas roll OR") positioned outside the canvas K1 and a canvas roll (hereinafter also referred to as an "inside canvas roll IR") positioned inside the canvas K1 (hereinafter also referred to as a "second guidance").

At this time, the canvas K1 has a loop shape in a side view. At this time, any point on the surface of the canvas K1 alternately passes through the first guidance and the second guidance.

The canvas K1 travels at the same speed as the conveyance speed of the wet paper integrally with the wet paper X while pressing the wet paper X against each of the dryer rolls D1 to D9, as described above. If the conveyance speed of the wet paper X and a traveling speed Vp of the canvas K1 differ from each other, the surface of the wet paper X may be rubbed to fuzz.

Therefore, the traveling speed Vp of the canvas K1 is 500 m/min or more, preferably 500 to 1800 m/min, and more preferably 500 to 1300 m/min, like the conveyance speed of the wet paper X.

A length K of the canvas K1 is 20 to 80 m, and preferably 40 to 70 m.

If the length K of the canvas K1 is less than 20 m, the canvas K1 may easily wear. If the length K of the canvas K1 exceeds 80 m, there is a disadvantage that a space is required because the device becomes enormous.

In the chemical solution spraying method, when both the traveling speed Vp of the canvas and the length K of the canvas are respectively set within the above-described ranges, the productivity is improved, thereby making it possible to manufacture paper products at lower cost.

In the first guidance, a time period Tc during which any point on the surface of the canvas K1 is in contact with the wet paper X is 0.03 seconds or more, preferably 0.05 seconds or more, and more preferably 0.05 to 5 seconds.

If the time period Tc during which the canvas K1 is in contact with the wet paper X is less than 0.03 seconds, a difference from the conventional technique is small, and a specific effect of the present invention is not obtained.

In the second guidance, a time period during which any point on the surface of the canvas K1 travels is not particularly limited.

In the first guidance, a distance at which any point on the surface of the canvas K1 travels while contacting the wet paper X is preferably 0.5 to 16 m.

If the distance at which any point on the surface of the canvas K1 travels while contacting the wet paper X is less than 0.5 m, there is a disadvantage that drying unevenness easily occurs because drying of the wet paper X more depends on some of the dryer rolls than when the distance is within the above-described range. If the distance at which any point on the surface of the canvas K1 travels while contacting the wet paper X exceeds 16 m, there is a disadvantage that the device more increases in size than when the distance is within the above-described range.

In the second guidance, the chemical solution is sprayed by a nozzle device S at a position indicated by an arrow P illustrated in FIG. 1 toward the canvas K1. That is, in a time period elapsed until the canvas K1 contacts the first outside canvas roll OR after separating from the wet paper X, the nozzle device S sprays the chemical solution onto the canvas K1.

This makes it possible to also transfer the chemical solution to the outside canvas roll OR that contacts the surface side of the canvas K1. As a result, an effect based on the chemical solution can also be provided to the outside canvas roll OR. When the transfer of the chemical solution to the outside canvas roll OR is saturated, a transfer amount of the chemical solution on the surface of the canvas K1 to the outside canvas roll OR is reduced, thereby enabling a sufficient amount of the chemical solution to remain on the surface of the canvas K1.

The canvas K1 has a loop shape, as described above. Accordingly, when the canvas K1 is traveled, any point on the surface of the canvas K1 returns to the same position via the first guidance and the second guidance after an elapse of a predetermined time period. That is, one cycle is performed by passing through the first guidance and the second guidance. Thus, the canvas K1 repeatedly contacts the wet paper X every time it travels by an amount corresponding to one cycle.

At this time, a number of times of contact N of any point of the canvas K1 with the wet paper X during a time period Tn required for the nozzle device S to one-way move, described below, satisfies a relationship of $N=(Tn \cdot Vp)/K$.

This makes it possible to apply, even when the chemical solution is sprayed while reciprocating the nozzle device S in the width direction with respect to the canvas K1 that travels at high speed, the chemical solution as uniformly as possible to the surface of the canvas K1 and enables a sufficient amount of the chemical solution to remain thereon.

The number of times of contact N is a number of times one cycle is repeated during the time period Tn.

Specifically, the number of times of contact N is preferably 50 to 150, and more preferably 60 to 120.

If the number of times of contact N is less than 50, an amount of the chemical solution to be absorbed by the wet paper X is reduced, while an amount of the chemical solution remaining on the canvas D1 is increased. Accordingly, the canvas K1 may be contaminated by a solid content contained in the chemical solution itself. If the number of times of contact N exceeds 150, the amount of the chemical solution to be absorbed by the wet paper is increased, whereby the amount of the chemical solution may be partially insufficient on the canvas K1.

Although a material for the canvas K1 is not particularly limited, an example of the material to be favorably used is polyethylene, polypropylene, polyester, polyacrylic, polyamide, polyphenylene sulfide, Nomex, their copolymers, or their polymer alloys.

As a tissue of the canvas K1, a fabric, a nonwoven fabric, a braid, or the like can be appropriately adopted.

Although the type of the canvas K1 is not particularly limited, an example of the type to be favorably used is a woven canvas using a monofilament, a multifilament, or a spun yarn as each of a warp yarn and a weft yarn or a spiral canvas using a plurality of spiral coils made of synthetic resin and a core wire of a multifilament.

The air permeability of the canvas K1 is preferably 2000 to 50000 $cm^3/cm^2 \cdot min$.

If the air permeability of the canvas K1 is less than 2000 $cm^3/cm^2 \cdot min$, the canvas K1 is more easily clogged with contaminants than when the air permeability thereof is within the above-described range, and the contaminants may not be removable in normal cleaning. If the air permeability of the canvas K1 exceeds 50000 $cm^3/cm^2 \cdot min$, the wet paper X may be unable to be sufficiently brought into pressure contact with the dryer roll side in the first guidance than when the air permeability thereof is within the above-described range.

Figure 2:
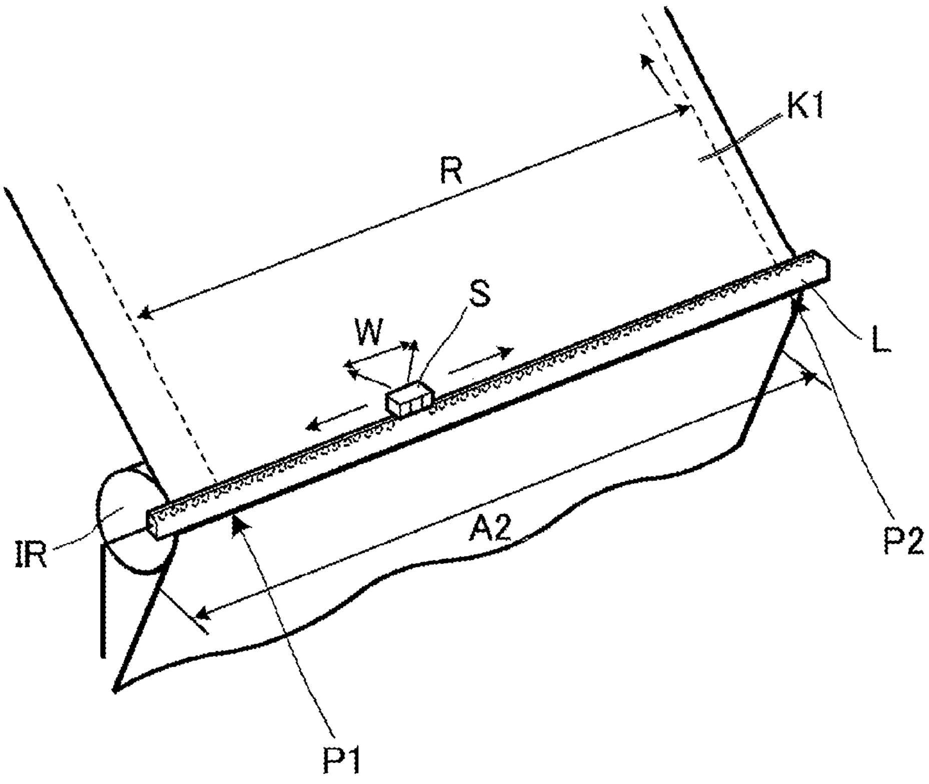
FIG. 2 is a schematic perspective view illustrating a state where a nozzle device is spraying a chemical solution onto a canvas in the chemical solution spraying method according to the present embodiment.

FIG. 2 is a schematic perspective view illustrating a state where the nozzle device sprays the chemical solution onto the canvas in the chemical solution spraying method according to the present embodiment.

As illustrated in FIG. 2, in the chemical solution spraying method, one nozzle device S sprays the chemical solution onto the canvas K1 while being reciprocated along a rail L extending in the width direction of the canvas K1 with the canvas K1 traveled.

In the chemical solution spraying method, the spray amount of the chemical solution to be maintained on the surface of the dryer roll at the time of an operation is 0.1 to 500 $mg/m^2$, preferably 0.3 to 500 $mg/m^2$, more preferably 1 to 250 $mg/m^2$, and still more preferably 1.5 to 95 $mg/m^2$ as an effective component amount.

The "effective component amount" means a total amount of components such as an oil, a surface active agent, resin, and an inorganic salt other than water in the chemical solution. That is, the spray amount means an effective component amount contained in the chemical solution applied to the canvas K1 per 1 $m^2$.

If the spray amount of the chemical solution is less than 0.1 $mg/m^2$ as an effective component amount, the chemical solution is absorbed in the wet paper X, and thus an effect based on the chemical solution cannot be sufficiently exhibited. If the spray amount of the chemical solution exceeds 500 $mg/m^2$ as an effective component amount, a solid content contained in the chemical solution itself may cause contamination.

In the chemical solution spraying method, the nozzle device S reciprocates in the width direction along the rail L by a belt (not illustrated) incorporated in the rail L.

At this time, the nozzle device S reciprocates between a position P1 of the rail L corresponding to one end of the wet paper X and a position P2 of the rail L corresponding to the other end of the wet paper X.

Movement control of the nozzle device S is performed using a plurality of sensors (not illustrated) attached to the rail L.

The nozzle device S momentarily sprays the chemical solution in a fan shape in a front view toward the canvas K1. The front view means viewing from the upstream side or the downstream side in the traveling direction of the canvas K1.

Therefore, the nozzle device S sprays the chemical solution in a fan shape extending in the width direction of the canvas K1 or in a radial shape.

A spray width W of the chemical solution in the canvas K1 in a case where the nozzle device S momentarily sprays the chemical solution onto the canvas K1 is preferably 1.5 to 15 cm, and more preferably 3 to 9 cm.

If the spray width W is less than 1.5 cm, there is a disadvantage that a time period elapsed until the nozzle device S reciprocates and spreads the chemical solution again is longer and the number of times of contact N of the wet paper is larger than when the spray width W is within the above-described range. If the spray width W exceeds 15 cm, there is a disadvantage that an efficiency of adhesion to a target is more reduced by scattering at an end of the spray width due to low impact than when the spray width W is within the above-described range. The spray width W means a maximum width of a spray portion of the chemical solution in the width direction of the canvas K1.

In the chemical solution spraying method, a distance of one way in which the nozzle device S moves corresponds to half of a paper width R of the wet paper X. That is, a distance of reciprocation in which the nozzle device S moves corresponds to the paper width R of the wet paper X.

The paper width R of the wet paper X to be used is favorably 5 m or more from the viewpoint of the productivity, and is more favorably 5 to 13 m from the viewpoint of the yield.

Figure 3A:
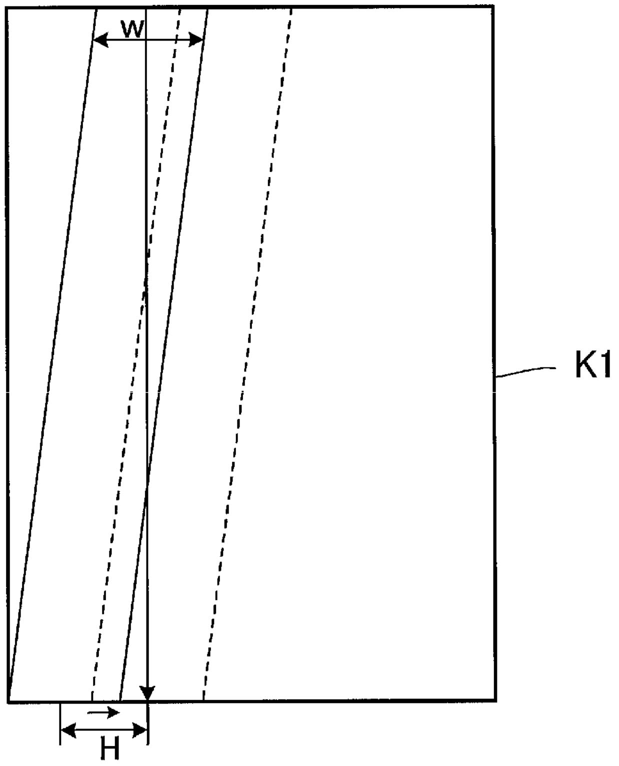
FIGS. 3(*a*) and 3(*b*) are development views each corresponding to a single rotation of the canvas in a case where the chemical solution is sprayed onto the canvas in the chemical solution spraying method according to the present embodiment.
Figure 3B:
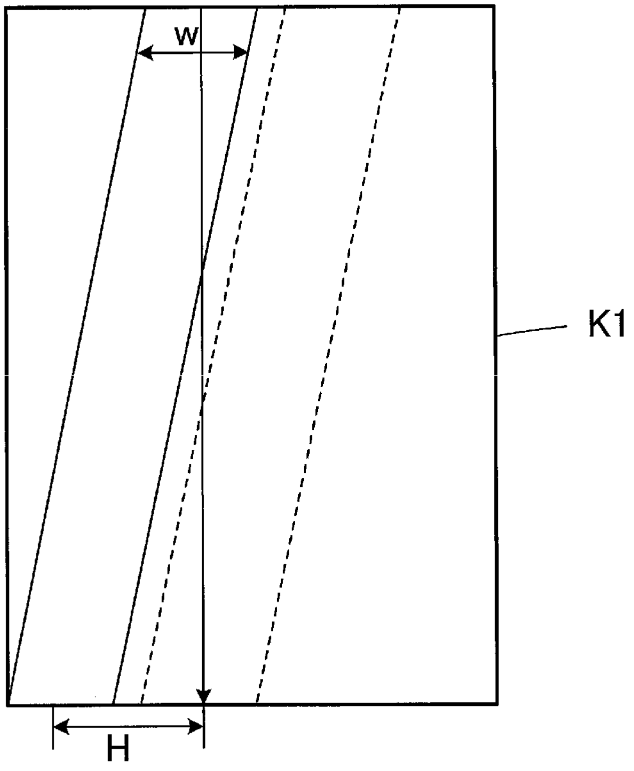

FIGS. 3(*a*) and 3(*b*) are development views each corresponding to a single rotation of the canvas in a case where the chemical solution is sprayed onto the canvas in the chemical solution spraying method according to the present embodiment.

In the chemical solution spraying method, the nozzle device S continuously sprays the chemical solution while moving in the width direction while the canvas K1 rotates once. Accordingly, as illustrated in FIGS. 3(*a*) and 3(*b*), the chemical solution forms a spray portion having a shape of a parallelogram in the development views corresponding to a single rotation of the canvas.

For example, if the spray width W of the chemical solution is larger than a movement distance H of the nozzle device S while the canvas K1 rotates once, spray portions overlap each other, as illustrated in FIG. 3(*a*). On the other hand, if the spray width W of the chemical solution is smaller than a movement distance H of the nozzle device S while the canvas K1 rotates once, a gap occurs between the spray portions, as illustrated in FIG. 3(*b*).

Therefore, to apply the chemical solution to the canvas K1 such that no gap occurs between the spray portions, the movement distance H of the nozzle device S and the spray width W of the chemical solution while the canvas K1 rotates once are preferably set to satisfy $H \leq W$.

This makes it possible to calculate an average movement speed Va of the nozzle device S capable of applying the chemical solution such that no gap occurs.

The nozzle device S reciprocates at the predetermined speed Vc along the rail L. In respective folded portions on both sides, the speed of the nozzle device S does not exceed the above-described predetermined speed Vs, although accompanied by deceleration and acceleration.

The predetermined speed Vc can be set by dividing the movement distance H of the nozzle device S by a time period during which the canvas K1 rotates once (the length K of the canvas K1/the traveling speed Vp).

The movement distance H of the nozzle device S while the canvas K1 rotates once is preferably 0.5 to 45 cm, and more preferably 0.5 to 30 cm.

If the movement distance H is less than 0.5 cm, there is a disadvantage that a time period elapsed until the nozzle device S reciprocates and spreads the chemical solution again is longer and the number of times of contact of the wet paper X, described below, is larger than when the movement distance H is within the above-described range. If the movement distance H exceeds 45 cm, there is a disadvantage that an efficiency of adhesion to a target is more reduced by scattering at an end of the spray width due to low impact than when the movement distance H is within the above-described range.

The average movement speed Va of the nozzle device S is set in view of the predetermined speed Vc and the deceleration and the acceleration in the folded portions, described above.

Specifically, the average movement speed Va of the nozzle device S is preferably 0.5 to 6 m/min. In this case, it is possible for the nozzle device S to stably spray the chemical solution.

The time period Tn required for the nozzle device S to one-way move is calculated from the paper width R of the wet paper and the average movement speed Va of the nozzle device S to satisfy the relationship of $Tn=R/Va$. A time period required to one-way move is a time period obtained by reducing a time period required for the nozzle device S to reciprocate to half, and does not matter whether one way is an outward path or a return path.

The time period Tn can be thus calculated, thereby enabling, even when the paper width has changed by changing a setup of the wet paper, for example, a sufficient amount of the chemical solution to remain on the surface of the canvas by adjusting the movement speed or the like of the nozzle device.

Specifically, the time period Tn required for the nozzle device S to one-way move is preferably 1 to 20 minutes, and more preferably 2 to 15 minutes.

If the time period Tn is less than one minute, friction between the nozzle device S and the rail L is great, which may cause a failure. If the time period Tn exceeds 20 minutes, a time period elapsed until the nozzle device S reciprocates and spreads the chemical solution again is long, and thus an effect based on the chemical solution tends to be difficult to obtain.

It is also possible to fix the time period Tn required for the nozzle device S to one-way move in this range and change the paper width R of the wet paper or the average movement speed Va of the nozzle device S to satisfy the above-described equation.

When the canvas K1 is a fabric made of polyethylene and the chemical solution is sprayed under a temperature condition of 30 to 130 degrees, an absolute value of a zeta potential of the chemical solution is preferably 3 to 100 mV, and more preferably 20 to 80 mV.

If the absolute value of the zeta potential is less than 3 mV, an adsorption force of the chemical solution to the canvas K1 is smaller than when the absolute value of the zeta potential is within the above-described range. Accordingly, an amount of the chemical solution remaining on the canvas K1 may be insufficient. If the absolute value of the zeta potential exceeds 100 mV, the adsorption force of the chemical solution to the canvas K1 is larger than when the absolute value of the zeta potential is within the above-described range. Accordingly, the amount of the chemical solution remaining on the canvas K1 is too large. As a result, the canvas K1 may be contaminated by a solid content contained in the chemical solution itself.

Examples of the chemical solution to be used in the chemical solution spraying method include an antifouling agent composition, a release agent composition, and a cleaning agent composition.

Among them, the chemical solution is preferably an antifouling agent composition containing at least an antifouling agent and water. In this case, it is possible to prevent paper powder or pitch contained in the wet paper from adhering to the canvas K1.

The antifouling agent preferably contains at least one type selected from a group consisting of an amino-modified silicone oil, an epoxy-modified silicon oil, a polyether-modified silicone oil, polybutene, a vegetable oil, and a synthetic ester oil, and more preferably contains an amino-modified silicone oil, a synthetic ester oil, or a vegetable oil.

When the antifouling agent contains at least one type of silicone-based oil selected from a group consisting of an amino-modified silicone oil, an epoxy-modified silicon oil, and a polyether-modified silicone oil, the pH thereof is preferably 3.0 to 6.0, the median diameter of its emulsion is preferably 0.05 to 1.2 μm, the viscosity thereof is preferably 100 mPa·s or less, and the zeta potential thereof is preferably 23 to 80 mV.

When the antifouling agent contains at least one type of non-silicone-based oil selected from a group consisting of polybutene, a vegetable oil, and a synthetic ester oil, the pH thereof is preferably 8.5 to 10.5, the median diameter of its emulsion is preferably 0.05 to 1.2 μm, the viscosity thereof is preferably 100 mPa·s or less, and the zeta potential thereof is preferably −80 to −15 mV.

Although the preferred embodiment of the present invention has been described above, the present invention is not limited to the above-described embodiment.

In the chemical solution spraying method according to the present embodiment, the nozzle device S sprays the chemical solution onto the canvas K1 in a time period elapsed until the canvas K1 contacts the first outside canvas roll OR after separating from the wet paper X. However, in addition thereto, the number of nozzle devices S may be further increased to spray a chemical solution onto a canvas K1.

In this case, a position of the nozzle device S to be added may be on the upstream side or the downstream side of an outside canvas roll OR with respect to traveling of the canvas K1.

In the chemical solution spraying method according to the present embodiment, although the movement distance H of the nozzle device S and the spray width W of the chemical solution while the canvas K1 rotates once are set to satisfy H≤W in order to apply the chemical solution to the canvas K1 such that no gap occurs between the spray portions, such a calculation method is not essential. That is, the predetermined speed Vc of the nozzle device S may be calculated as a condition under which a gap occurs between the spray portions. Even if the gap occurs between the spray portions, the nozzle device S sprays the chemical solution while repeatedly reciprocating. Accordingly, the gap will be solved in the near future.

EXAMPLES

The present invention will be further specifically described below by way of examples, but the present invention is not limited to the examples.

Examples 1 to 13 and Comparative Examples 1 to 25

In an actual paper-making machine as illustrated in FIG. 1, a chemical solution was sprayed onto a canvas K1 using a nozzle device S, as illustrated in FIG. 2.

A paper width R of wet paper used at this time was 6 m, and a spray width W of the chemical solution was 8 cm.

Examples of the chemical solutions to be used in examples 1 to 9 and comparative examples 1 to 17, examples 10 to 11 and comparative examples 18 to 21, and examples 12 and 13 and comparative examples 22 to 25 were respectively an antifouling agent composition (Clean Keeper PBS0304D (an amino-modified silicone oil) manufactured by Maintech Co., Ltd.) having a zeta potential of 56.8 mV, an antifouling agent composition (a polyether-modified silicone oil as a main component) having a zeta potential of 0 mV, and an antifouling agent composition (a main component: a synthetic ester oil) having a zeta potential of −64.0 mV. Each of the chemical solutions was applied to the canvas K1 such that its spray amount was 20 mg/m$^2$ as an effective component amount.

Respective conditions of a contact time period Tc (sec) between the canvas and the wet paper, a time period Tn (min) required for the nozzle device to one-way move, a traveling speed Vp (m/min) of the canvas, and a length K (m) of the canvas were adjusted, as illustrated in Table 1, and a number of times of contact N was calculated from the values.

TABLE 1

| | Tc (sec) | Tn (min) | Vp (m/min) | K (m) | N (times) |
|---|---|---|---|---|---|
| Example 1 | 0.85 | 12.00 | 500 | 45 | 133 |
| Example 2 | 0.85 | 6.00 | 500 | 45 | 67 |
| Example 3 | 0.64 | 12.00 | 800 | 66 | 145 |
| Example 4 | 0.64 | 6.00 | 800 | 66 | 73 |
| Example 5 | 0.51 | 6.00 | 1000 | 60 | 100 |
| Example 6 | 0.51 | 3.00 | 1000 | 60 | 50 |
| Example 7 | 0.34 | 3.00 | 1500 | 45 | 100 |
| Example 8 | 0.34 | 2.00 | 1500 | 45 | 67 |
| Example 9 | 0.34 | 1.50 | 1500 | 45 | 50 |
| Example 10 | 0.51 | 6.00 | 1000 | 60 | 100 |
| Example 11 | 0.51 | 3.00 | 1000 | 60 | 50 |
| Example 12 | 0.51 | 6.00 | 1000 | 60 | 100 |
| Example 13 | 0.51 | 3.00 | 1000 | 60 | 50 |
| Comparative example 1 | 0.85 | 20.00 | 500 | 45 | 222 |
| Comparative example 2 | 0.85 | 3.00 | 500 | 45 | 33 |
| Comparative example 3 | 0.85 | 2.00 | 500 | 45 | 22 |
| Comparative example 4 | 0.85 | 1.50 | 500 | 45 | 17 |
| Comparative example 5 | 0.64 | 20.00 | 800 | 66 | 242 |
| Comparative example 6 | 0.64 | 3.00 | 800 | 66 | 36 |
| Comparative example 7 | 0.64 | 2.00 | 800 | 66 | 24 |
| Comparative example 8 | 0.64 | 1.00 | 800 | 66 | 18 |
| Comparative example 9 | 0.51 | 20.00 | 1000 | 60 | 333 |
| Comparative example 10 | 0.51 | 12.00 | 1000 | 60 | 200 |
| Comparative example 11 | 0.51 | 2.00 | 1000 | 60 | 33 |
| Comparative example 12 | 0.51 | 1.50 | 1000 | 60 | 25 |
| Comparative example 13 | 0.34 | 12.00 | 1500 | 45 | 400 |
| Comparative example 14 | 0.34 | 6.00 | 1500 | 45 | 200 |
| Comparative example 15 | 0.34 | 1.20 | 1500 | 45 | 40 |
| Comparative example 16 | 0.34 | 1.00 | 1500 | 45 | 33 |
| Comparative example 17 | 0.34 | 0.86 | 1500 | 45 | 29 |
| Comparative example 18 | 0.51 | 20.00 | 1000 | 60 | 333 |
| Comparative example 19 | 0.51 | 12.00 | 1000 | 60 | 200 |
| Comparative example 20 | 0.51 | 2.00 | 1000 | 60 | 33 |
| Comparative example 21 | 0.51 | 1.50 | 1000 | 60 | 25 |
| Comparative example 22 | 0.51 | 20.00 | 1000 | 60 | 333 |
| Comparative example 23 | 0.51 | 12.00 | 1000 | 60 | 200 |
| Comparative example 24 | 0.51 | 2.00 | 1000 | 60 | 33 |
| Comparative example 25 | 0.51 | 1.50 | 1000 | 60 | 25 |

Evaluation Method

In the examples 1 to 13 and the comparative examples 1 to 25, conditions of contamination due to pitch, paper powder, or the like that had adhered to a surface of the canvas K1 after an elapse of five days were visually evaluated.

In the evaluation, a state where no dirt had adhered to the surface of the canvas K1, a state where dirt had adhered to approximately 10 percent of the entire surface of the canvas K1, a state where dirt had adhered to approximately 10 to 30 percent of the entire surface of the canvas K1, and a state where dirt had adhered to 30 percent or more of the entire surface of the canvas K1 were respectively set as "Excellent", "Good", "Fair", and "Poor". If the evaluation is "Excellent", "Good", or "Fair", it can be said that an antifouling effect based on the antifouling agent composition has been exhibited.

Table 2 illustrates obtained results.

TABLE 2

| | Conditions of contamination | | Conditions of contamination |
|---|---|---|---|
| Example 1 | ○ | Comparative example 7 | X |
| Example 2 | ◎ | Comparative example 8 | X |
| Example 3 | ○ | Comparative example 9 | X |
| Example 4 | ◎ | Comparative example 10 | X |
| Example 5 | ◎ | Comparative example 11 | X |
| Example 6 | ○ | Comparative example 12 | X |
| Example 7 | ◎ | Comparative example 13 | X |
| Example 8 | ◎ | Comparative example 14 | X |
| Example 9 | ○ | Comparative example 15 | X |
| Example 10 | ○ | Comparative example 16 | X |
| Example 11 | Δ | Comparative example 17 | X |
| Example 12 | ◎ | Comparative example 18 | X |
| Example 13 | ○ | Comparative example 19 | X |
| Comparative example 1 | X | Comparative example 20 | X |
| Comparative example 2 | X | Comparative example 21 | X |
| Comparative example 3 | X | Comparative example 22 | X |
| Comparative example 4 | X | Comparative example 23 | X |
| Comparative example 5 | X | Comparative example 24 | X |
| Comparative example 6 | X | Comparative example 25 | X |

As apparent from the results illustrated in Table 2, the chemical solution spraying method in each of the examples 1 to 13 makes it possible to more sufficiently prevent the canvas K1 from being contaminated than the chemical solution spraying method in each of the comparative examples 1 to 25. Thus, it can be said that the antifouling agent composition has sufficiently remained on the surface of the canvas K1 and an effect produced thereby has been exhibited.

In the examples 1 to 9 each using the antifouling agent composition having an absolute value of the zeta potential of 56.8 mV and the examples 12 and 13 each using the antifouling agent composition having an absolute value of the zeta potential of 64.0 mV, the antifouling effect is more excellent. Further, when the number of times of contact is 67 to 100 among them, the antifouling effect is much more excellent.

INDUSTRIAL APPLICABILITY

A chemical solution spraying method according to the present invention is favorably used as a spraying method in a case where a chemical solution is sprayed onto a canvas in a dry part in a paper-making machine. The present invention makes it possible to apply the chemical solution to a surface of the canvas that is in contact with wet paper for a time period Tc of 0.03 seconds or more as uniformly as possible and enables a sufficient amount of the chemical solution to remain thereon while reciprocating a nozzle device in a width direction with respect to the canvas.

REFERENCE SIGNS LIST

10 . . . breaker stack roll,
C . . . calendar roll,
D1, D2, D3, D4, D5, D6, D7, D8, D9 . . . dryer roll,
DK . . . doctor blade,
DP . . . dry part,
H . . . movement distance,
IR . . . inside canvas roll,
K1 . . . canvas,
L . . . rail,
OR . . . outside canvas roll,
P1, P2 . . . position,
R . . . paper width,
S . . . nozzle device,
W . . . spray width, and
X . . . wet paper.

The invention claimed is:

1. A chemical solution spraying method for spraying a chemical solution onto a canvas having a continuous canvas loop while reciprocating a nozzle device along a rail extending in a width direction of the canvas with respect to the canvas in a dry part of a paper-making machine, wherein
- the canvas is guided by a dryer roll with the canvas contacting wet paper, and is then guided by a canvas roll with the canvas separating from the wet paper,
- a time period Tc during which the canvas is in contact with the wet paper is 0.03 seconds or more,
- a distance of the canvas travels during the time period Tc is 0.5 to 16 m,
- a time period Tn required for the nozzle device to one-way move is 1 to 20 minutes,
- a traveling speed Vp of the canvas is 500 m/min or more,
- a length K of the canvas is 20 to 80 m,
- a number of times of contact N of any point on a surface of the canvas with the wet paper during the time period Tn, the time period Tn, the traveling speed Vp, and the length K satisfy a relationship of $N=(Tn \cdot Vp)/K$, and the number of times of contact Nis 50 to 150, and
- a spray amount of the chemical solution is 0.1 to 500 $mg/m^2$ as a total amount of components other than water in the chemical solution,
- an air permeability of the canvas is 2000 to 50000 $cm^3/cm^2 \cdot min$,
- the canvas roll includes an outside canvas roll positioned outside the canvas and an inside canvas roll positioned inside the canvas, and
- the nozzle device sprays the chemical solution onto the canvas in a time period elapsed until the canvas contacts the outside canvas roll after separating from the wet paper.

2. The chemical solution spraying method according to claim 1, wherein
- an average movement speed Va of the nozzle device is 0.5 to 6 m/min,
- a paper width R of the wet paper is 5 to 13 m, and
- the average movement speed Va, the paper width R, and the time period Tn satisfy a relationship of $Tn=R/Va$.

3. The chemical solution spraying method according to claim 1, wherein
- the nozzle device sprays a chemical solution in a fan shape extending in a width direction in a front view toward the canvas, and a spray width in the canvas of the chemical solution to be momentarily sprayed by the nozzle device is 1.5 to 15 cm.

4. The chemical solution spraying method according to claim 1, wherein the wet paper contains 50% by mass or more of recycled pulp.

5. The chemical solution spraying method according to claim 1, wherein the chemical solution is an antifouling agent composition containing at least one type selected from a group consisting of an amino-modified silicone oil, an epoxy-modified silicon oil, a polyether-modified silicone oil, polybutene, a vegetable oil, and a synthetic ester oil.

6. The chemical solution spraying method according to claim 1, wherein a material for the canvas is polyethylene, an absolute value of a zeta potential of the chemical solution is 3 to 100 mV, and the chemical solution is sprayed under a temperature condition of 30 to 130 degrees.

7. The chemical solution spraying method according to claim 1, wherein the canvas is a woven canvas using a monofilament, a multifilament, or a spun yarn as each of a warp yarn and a weft yarn or a spiral canvas using a plurality of spiral coils made of synthetic resin and a core wire of a multifilament.

* * * * *